US012760662B2

(12) United States Patent
Brockett

(10) Patent No.: US 12,760,662 B2
(45) Date of Patent: Oct. 13, 2026

(54) DAMPING AND CENTERING SYSTEM FOR ROTATING MACHINERY

(71) Applicant: HONEYWELL INTERNATIONAL INC., Charlotte, NC (US)

(72) Inventor: Theodore Brockett, Phoenix, AZ (US)

(73) Assignee: HONEYWELL AEROSPACE US LLC, Phoenix, AZ (US)

( * ) Notice: Subject to any disclaimer, the term of this patent is extended or adjusted under 35 U.S.C. 154(b) by 76 days.

(21) Appl. No.: 18/917,428

(22) Filed: Oct. 16, 2024

(65) Prior Publication Data

US 2026/0103996 A1 Apr. 16, 2026

(51) Int. Cl.
*F16C 27/04* (2006.01)
*F01D 25/16* (2006.01)

(52) U.S. Cl.
CPC .......... *F01D 25/164* (2013.01); *F16C 27/045* (2013.01); *F05D 2240/50* (2013.01); *F05D 2260/38* (2013.01); *F05D 2260/96* (2013.01); *F16C 2360/23* (2013.01)

(58) Field of Classification Search
CPC ............... F01D 25/164; F05D 2240/50; F05D 2260/38; F05D 2260/96; F16C 2360/23; F16C 27/045
See application file for complete search history.

(56) References Cited

U.S. PATENT DOCUMENTS 4,669,893 A * 6/1987 Chalaire ............... F16C 27/045
384/535
5,380,100 A 1/1995 Yu
5,421,655 A 6/1995 Ide et al.
5,425,584 A * 6/1995 Ide ........................ F01D 25/164
384/99
5,603,574 A 2/1997 Ide et al.
5,743,654 A 4/1998 Ide et al.
7,625,121 B2 12/2009 Pettinato et al.
7,628,542 B2 12/2009 Wada et al.
8,562,224 B2 * 10/2013 Duffy ...................... F16C 33/60
384/475
10,808,713 B2 * 10/2020 Lucchetta ............. F04D 29/059
10,935,073 B2 3/2021 Verrelst et al.
(Continued)

FOREIGN PATENT DOCUMENTS

CA 2964653 A1 11/2017
CN 102705427 A 10/2012

*Primary Examiner* — Andrew J Marien
(74) *Attorney, Agent, or Firm* — Ingrassia, Fisher & Lorenz LLP

(57) ABSTRACT

Systems provide damping and centering for rotating machinery. A system includes a ring encircling an axis where the ring is configured to receive a bearing element. The ring has a first axially directed face and a second axially directed face. The ring includes fluid apertures that are axially disposed and radially located outward from the axis, the fluid apertures opening through the first axially directed face and through the second axially directed face. The ring includes arcing slits, each arcing slit beginning at one of the fluid apertures and ending at another of the fluid apertures. A fluid delivery system delivers a fluid to the fluid apertures and/or the slits, at one of the axially directed faces. The fluid delivery system delivers the fluid into the arcing slits so that the fluid in the arcing slits provides a damping action in the ring.

18 Claims, 4 Drawing Sheets

(56) References Cited

U.S. PATENT DOCUMENTS

| | | | | |
|---|---|---|---|---|
| 2009/0263057 | A1* | 10/2009 | Kanki | B23H 9/00 384/99 |
| 2014/0140645 | A1* | 5/2014 | Meacham | F16C 27/02 384/129 |
| 2020/0018350 | A1* | 1/2020 | Weiner | F16C 32/0677 |
| 2020/0116200 | A1* | 4/2020 | Verrelst | F16C 27/02 |
| 2022/0056952 | A1* | 2/2022 | Ishimaru | F16C 27/066 |
| 2022/0120291 | A1* | 4/2022 | Payyoor | F04D 29/059 |
| 2022/0243616 | A1* | 8/2022 | Smedresman | F16F 1/025 |
| 2023/0258240 | A1* | 8/2023 | Takeuchi | F01D 25/164 384/100 |

* cited by examiner

DAMPING AND CENTERING SYSTEM FOR ROTATING MACHINERY

TECHNICAL FIELD

The present disclosure relates generally to rotating machinery and, more specifically, to a damping and centering system that interfaces between rotating elements and non-rotating support structures, such as between the rotor group and housing elements of a gas turbine engine.

BACKGROUND

Turbo machinery such as turbine engines may be employed to power various devices. For example, a gas turbine engine may be employed to power a mobile platform, such as aircraft, land vehicles, sea vehicles and other machines. Generally, within turbo machinery, at least two bearing elements are used to support the rotating elements on their supporting structure.

In rotating machinery, undesirable time varying disturbances such as vibrations may arise. These disturbances may change during various operational states. Given the possibility of extremely high rotational speeds, any such disturbances may have unwanted impacts on quality perception and/or product longevity. Minimizing disturbances in rotating machinery may provide quiet, comfortable and efficient operation of the machine and may reduce fatigue stress on the machine and its supporting structure.

Accordingly, it is desirable to provide systems for rotating machinery that minimize the effects of any mechanical disturbances such as vibrations. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Systems provide damping and centering for rotating machinery. In a number of embodiments, a system includes a ring encircling an axis where the ring is configured to receive a bearing element. The ring has a first axially directed face and a second axially directed face. The ring includes fluid apertures that are axially disposed and radially located outward from the axis, the fluid apertures opening through the first axially directed face and through the second axially directed face. The ring includes arcing slits, each arcing slit beginning at one of the fluid apertures and ending at another of the fluid apertures. A fluid delivery system delivers a fluid to the fluid apertures and/or the slits, at one of the axially directed faces. The fluid delivery system delivers the fluid into the arcing slits so that the fluid in the arcing slits provides a damping action in the ring.

In a number of other embodiments, a system provides damping and centering for rotating machinery. The system includes a support, a shaft disposed to rotate about an axis and relative to the support, and a ring encircling the shaft and the axis. The ring receives a bearing element and has a first axially directed face and a second axially directed face. The ring includes fluid apertures that are axially disposed and radially located outward from the axis, the fluid apertures opening through the first axially directed face and through the second axially directed face. The ring includes arcing slits, each arcing slit beginning at one of the fluid apertures and ending at another of the fluid apertures. A fluid delivery system delivers a fluid to at least one of the fluid apertures and the slits, at the first axially directed face. The fluid delivery system delivers the fluid into the arcing slits so that the fluid in the arcing slits provides a damping action in the ring.

In a number of additional embodiments, a system provides damping and centering for rotating machinery and includes a support. A shaft is disposed to rotate about an axis and relative to the support. A ring defines an open center and encircles the axis. The ring receives a bearing element in the open center. The ring has a first axially directed face and a second axially directed face. The ring includes fluid apertures that are axially disposed and radially located outward from the open center, the fluid apertures opening through the first axially directed face and through the second axially directed face. The ring includes arcing slits, each arcing slit beginning at one of the fluid apertures and ending at another of the fluid apertures. A fluid delivery system delivers a fluid to the fluid apertures and/or to the slits, at the first axially directed face. A metering plate meters the fluid exiting the fluid apertures at the second axially directed face. The fluid delivery system is configured to deliver the fluid to the arcing slits through the fluid apertures so that the fluid in the arcing slits provides a damping action in the ring.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
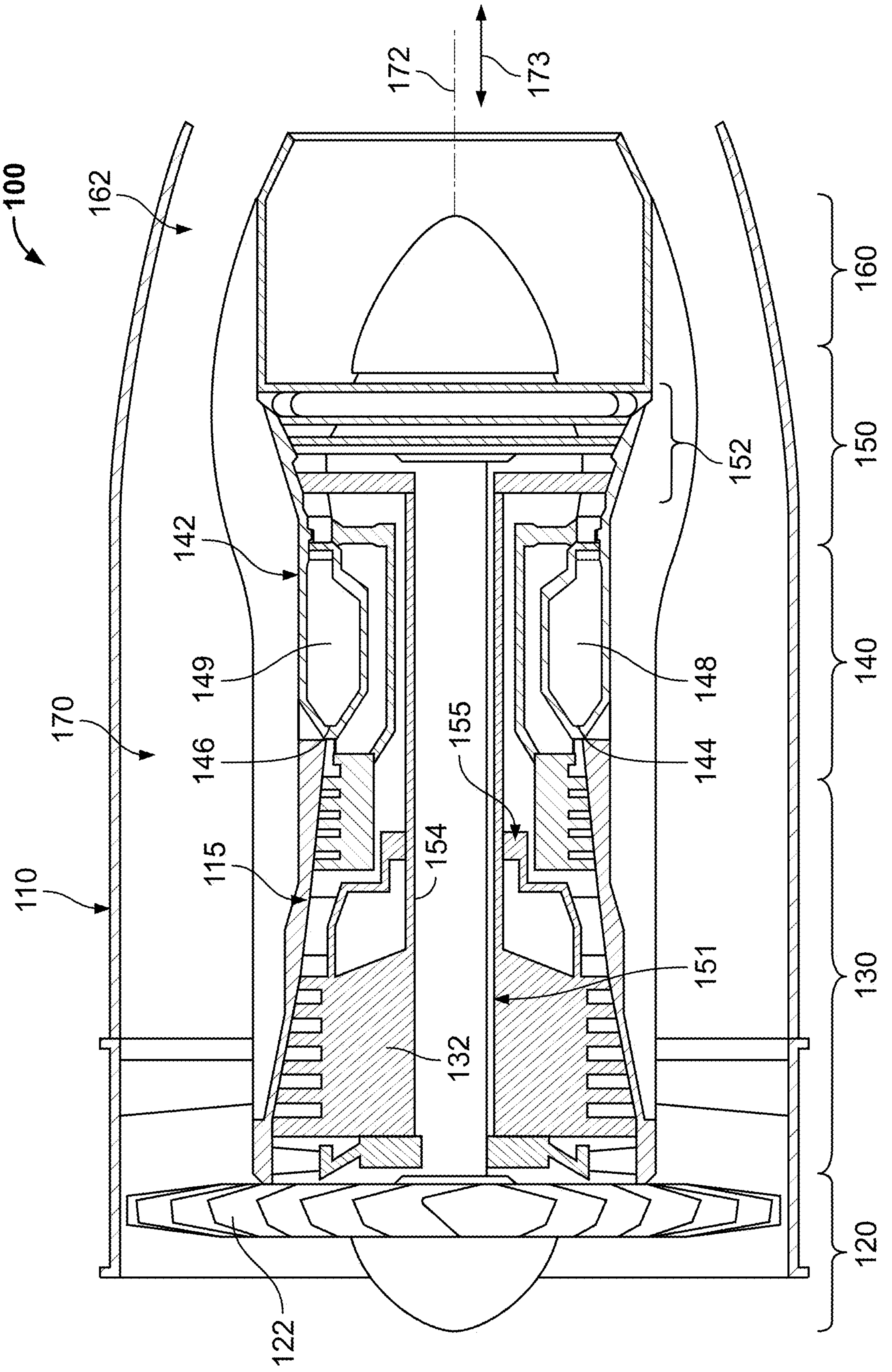
FIG. 1 is a schematic, sectional illustration of a rotating machine in the form of a gas turbine engine, in accordance with an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention if such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The exemplary embodiments discussed herein provide systems for damping and centering rotating elements such as in rotating machinery, including in an exemplary gas turbine engine. It will be appreciated that the disclosure is not limited to gas turbine engines but may be employed in various machines where damping and/or centering is desirable. In embodiments, the damping elements and the centering elements may be arranged in radially located positions relative to one another resulting in an axially compact system.

Referring to FIG. 1, a schematic, cross-sectional illustration of a rotating machine 100 embodied as a gas turbine engine is depicted according to an exemplary embodiment of a gas turbine. The rotating machine 100 may be used in any of a variety of applications. The rotating machine 100 may generally be contained in an engine case 110 and may include an inlet section 120, a compression section 130, a combustion section 140, a turbine section 150, and an exhaust section 160. The rotating parts of the rotating machine 100 rotate, such as on a shaft 154, about an axis 172. The axis 172 defines an axial direction 173 of the rotating machine 100. The engine case 110, along with various other components define a housing or housing assembly referred to generally as the support 115 for the rotating machine 100.

The inlet section 120 may, in some embodiments, include a fan 122, which draws in and accelerates at least a portion of the air directed to the compression section 130. A fraction of the accelerated air from the fan 122 is directed through a bypass section 170. The remaining fraction of air from the fan 122 is directed into the compression section 130. The compression section 130 may include a series of compressors 132 that raise the pressure of the air received from the inlet section 120. The compressors 132 then direct the compressed air to the combustion section 140. In the combustion section 140, the high pressure air is mixed with injected fuel and combusted. The combustion section 140 includes a combustor 142 that, in the current embodiment, is generally formed from one substantially cylindrical and/or conical combustor liner 144 attached to a dome 146. Air from the compression section 130 is generally directed into the combustor liner 144, which contains the combustion process in a combustion chamber 148. Some of the air from the compression section 130 is directed around the outside of the combustor liner 144 through a passage 149. After the combustion section 140, the combusted air is directed into the turbine section 150, which includes a series of turbines 152 to extract energy from the combusted air, which is then exhausted through the exhaust section 160.

The rotating elements of the rotating machine 100 include, among other components, the compressors 132, the turbines 152 and the shaft 154 forming a rotor group 151. The rotor group 151 may be supported, such as on the support 115 by a damping and centering system 155. The damping and centering system 155 may include any number of rotating to non-rotating interfaces, such as between the shaft 154 and the support 115 (or an element connected with the support 115). In embodiments, at least two such interfaces may be provided to support the rotor group 151 for rotation.

Figure 2:
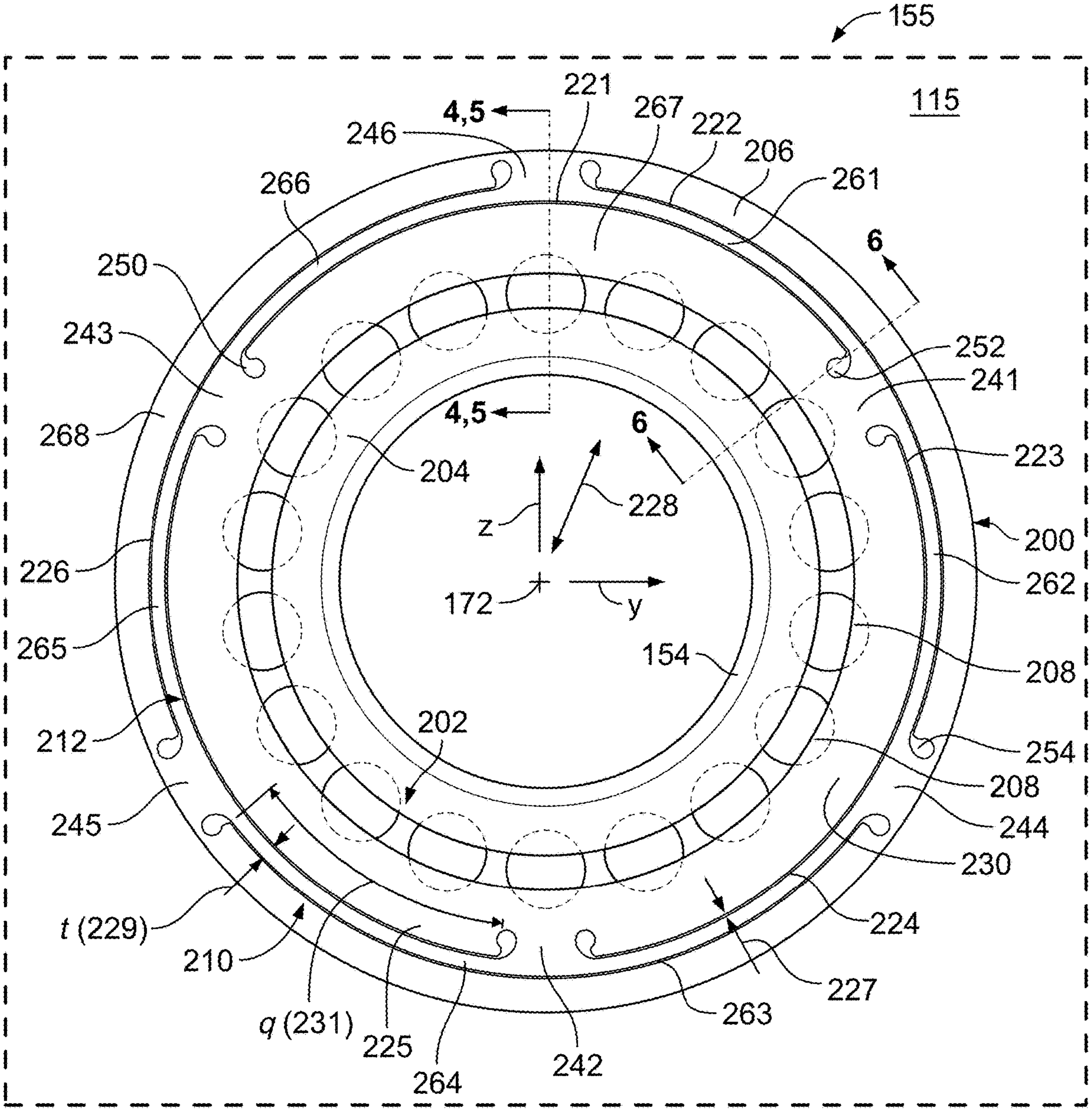
FIG. 2 is a schematic sectional view of a damping and centering system of the rotating machine of FIG. 1, in accordance with an exemplary embodiment.

Referring additionally to FIG. 2, a schematic illustration of the damping and centering system 155 is shown. A rotationally supporting interface 200 is provided between the support 115 and the shaft 154. The support 115 may be any type of non-rotating or relatively rotating component upon which the shaft 154 is supported. The interface 200 includes a type of bearing assembly 202, which in this embodiment is of the rolling element type and specifically a ball bearing type. In other embodiments, the bearing assembly 202 may be a journal bearing, or any other type of bearing appropriate for the application. The bearing assembly 202 includes a ring in the form of an inner race 204 engaged with the shaft 154, and includes another ring in the form of an outer race 206 engaged with the support 115. The bearing assembly 202 includes a number of elements 208, configured as balls in this embodiment, disposed between the rings of the inner race 204 and the outer race 206. The inner race 204 and the outer race 206 receive the elements 208 as bearing elements rolling in grooves.

In the current embodiment, the bearing assembly 202 includes features that provide damping and centering functions between the shaft 154 and the support 115. In other embodiments, those features may be provided as a part of the shaft 154, part of the support 115, part of an additional component such as an intermediate ring (not shown), or in a combination of the options. In the current embodiment, the features include a damper set 210 and a spring set 212. The damper set 210 includes dampers that may each be described as a type of squeeze film damper that use a fluid to dampen/control relative displacements between the shaft 154 and the support 115. The spring set 212 includes springs that may each be described as a type of beam springs that provide compliance between the shaft 154 and the support 115 and that may provide a centering function of the shaft 154 in the support 115.

The damper set 210 includes a number of slits 221-226 formed through the outer race 206 of the bearing assembly 202. The slits 221-226 and the surrounding structure of the outer race 206 function as dampers when a fluid is disposed within them. Each of the slits 221-226 provides an arc-shaped opening through the outer race 206 in the axial direction 173, which in this illustration is into and out of the view. Each of the slits 221-226 extends completely through the outer race 206 from one face 230 to the other face 232 (shown in FIG. 4). In the current embodiment, the slits 221-226 have a width 227 in the radial direction 228 that may be in or around the range of 0.1-0.2 millimeters, which may be different depending on the specific application.

The slits 221-226 are arranged in two concentric circles with an inner circle defined by the slits 221, 223 and 225 and an outer circle defined by the slits 222, 224 and 226. The slits 221, 223, 225 of the inner circle are angularly offset relative to the slits 222, 224, 226 of the outer circle by approximately 60 degrees around the axis 172. In the inner circle, each slit 221, 223 and 225 extends in an arc of approximately 110 degrees around the axis 172. This defines a land 241 between the slits 221 and 223, a land 242 between the slits 223 and 225, and a land 243 between the slits 225 and 221. Each of the lands 241-243 is an un-slit area that extends radially between the ends of adjacent slits of the inner circle of slits 221, 223, 225. For example, the land 241 extends radially between the ends of the slits 221 and 223. In the outer circle, each slit 222, 224 and 226 extends in an arc of approximately 110 degrees around the axis 172. This defines a land 244 between the slits 222 and 224, a land 245 between the slits 224 and 226, and a land 246 between the slits 226 and 222. Each of the lands 244-246 is an un-slit area that extends radially between the ends of adjacent slits of the outer circle of slits 222, 224, 226. Because of the angular offset of the slits in the inner and outer circles, the lands 241-243 are not in radial alignment with the lands 244-246. In other words, adjacent of the lands around the circumferential direction of the outer race 206 are spaced apart from one another by approximately 60 degrees around the axis 172. For example, the lands 241 and 244 are disposed on radial lines approximately 60 degrees apart from one another.

Figure 4:
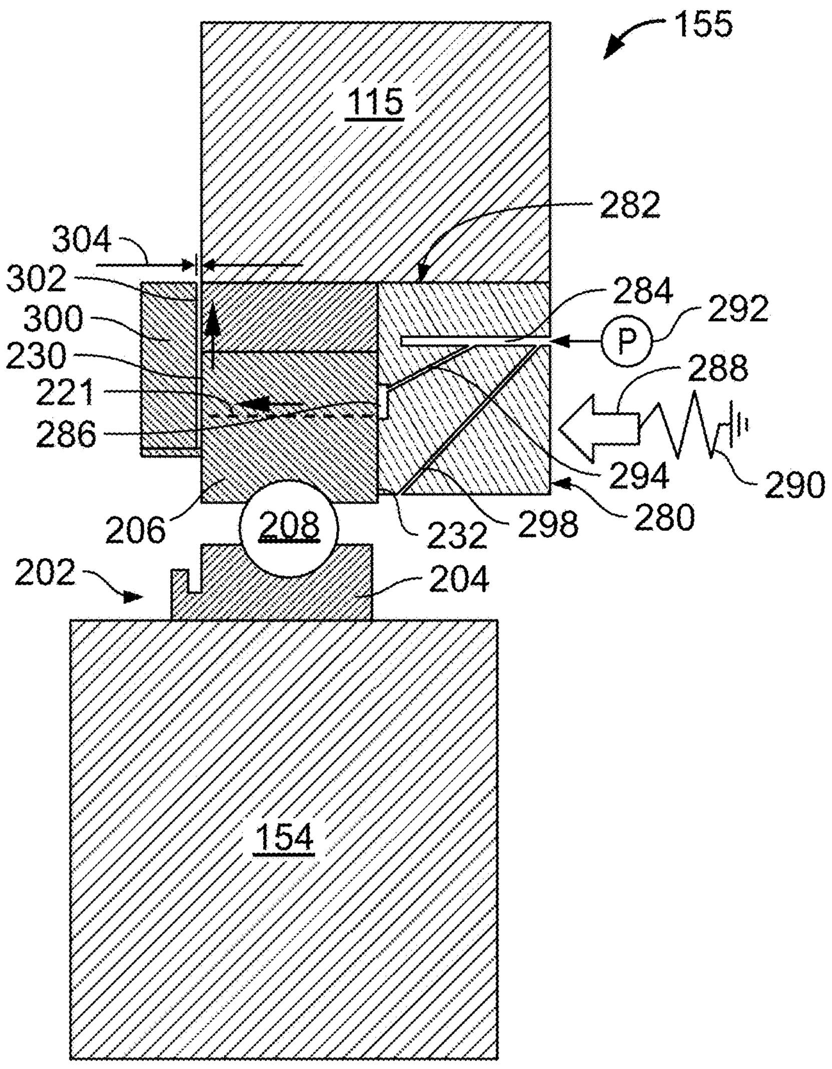
FIG. 4 is a sectional illustration taken generally through the area of the line 4-4 of FIG. 2, according to an exemplary embodiment.

Each of the slits 221-226 begins and ends with an aperture. For example, the slit 221 begins with an aperture 250 and ends with an aperture 252. The apertures 250 and 252 extend completely through the outer race 206 in the axial direction 173 from the face 230 to the other face 232 (FIG. 4). The apertures 250, 252, and those of all the slits 221-226 each provide an opening into which fluid may be directed to fill the slits 221-226.

The configuration of the slits 221-226 defines a number of flexible structures circumferentially distributed around the outer race 206 that are referred to as springs 261-266. The springs 261-266, which collectively make up the spring set 212, are formed integral with the outer race 206 and are located between the inner circle formed by the slits 221, 223 and 225 and the outer circle formed by slits 222, 224 and 226. The springs 261-266 allow an inner portion 267 of the outer race 206 to move relative to an outer portion 268 of the outer race 206, including in the radial direction 228. The inner portion 267 is defined radially inward from the slits 221-226 and the outer portion is formed radially outward from the slits 221-226. Six separate springs 261-266 are included in the current embodiment and are disposed between the inner portion 267 and the outer portion 268 in the radial direction. A different number may be provided around the circumference (such as 4, 8, 10) depending on the application.

The springs 261-266 are formed to have a target level of radially oriented stiffness values in "y" and "z" directions between inner portion 267 and the outer portion 268. The springs 261-266 are shaped as circumferentially oriented curved beams that collectively span the majority of the entire circumference of the outer race 206. The springs 261-266 collectively define an annular shape and are concentric with the inner race 204 and with the inner and outer portions 267, 268 of the outer race 206. The target stiffness in the different y and z directions is achieved by modifying the radial thickness 229 ("t") of the springs 261-266 and the circumferential extent 231 ("q" shown in FIG. 2) of the springs 261-266 for tuning to provide desirable properties.

Figure 3:
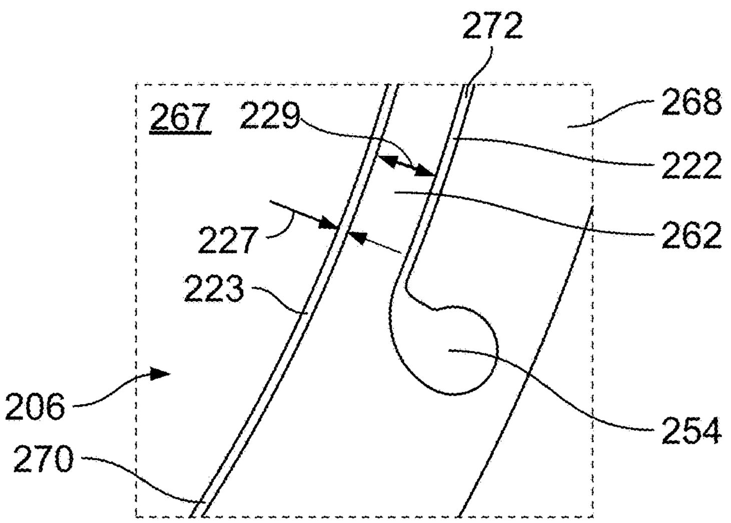
FIG. 3 is a fragmentary, detail view of a part of the damping and centering system of FIG. 2, in accordance with an exemplary embodiment.

Referring additionally to FIG. 3, the slits 221-226 define clearance spaces on the inner diameter of the springs 261-266 and other clearance spaces on the outer diameter of the springs 261-266. Each spring 261-266 may be tuned, such as to have a different t and/or a different extent q to achieve different net stiffness values "ky" and "kz" in the two radial directions y and z. The two radial directions may be orthogonal. In addition, the number of springs can be modified to achieve different net stiffness values "ky" and "kz." This may provide various rotor dynamic advantages. A shorter q may be used to generate a larger stiffness as may also be accomplished by a thicker t. For example, the t 229 and/or the q 231 may be different for the spring 261 than for the spring 263.

Each of the springs 261-266 is defined between adjacent of the lands 241-246. For example, the spring 261 extends between the land 246 and the land 241. Other than its connections to the lands 246, 241, the spring 261 is free to move, such as by flexing, oscillating and bending, relative to the remainder of the outer race 206. In an embodiment, the springs 263, 264 may be disposed below the bottom of the shaft 154 and the springs 266, 261 may be disposed above the top of the shaft 154. The springs 263 and 264 may be stiffer (have a thicker t or shorter q) as compared to the springs 266 and 261 to raise (center) the shaft 154 when at rest. Doing so may be desirable such as to avoid an off-center condition due to gravity. Other tuning between the springs 261-266 may be desirable for different dynamic purposes.

Referring still to FIGS. 1-3, the slits 221-226 may be configured to dampen the movement of the springs 261-266. For example, fluid, such as oil, may be directed into the slits 221-226 directly and/or via their apertures (e.g. apertures 250, 252 and aperture 254). By placing fluid in all the clearances adjacent the springs 261-266 (e.g., both in the inner diameter clearance 270 and the outer diameter clearance 272 of FIG. 3), a squeezing action is created on the fluid as the springs 261-266 move relative to other parts of the outer race 206. In operation, the size of the clearances 270, 272 change as vibrations are damped. In embodiments, the inner portion 267 of the outer race 206 may move radially relative to the outer portion 268 of the outer race 206, in addition to or in place of movement of the springs 261-266. In either case, the fluid dampens movement. Force is generated from squeezing action of the fluid in the slits 221-226 at both the outer diameter clearance 272 and the inner diameter clearance 270. The force vs. motion character may be tuned by using different clearances (272, 270) on the outer diameter of the springs 261-266 as compared to at the inner diameter of the springs 261-266.

Referring additionally to FIG. 4, to control and tune the forces of the squeezing actions in the slits 221-226, metering may be employed. As further described below, this may be accomplished by providing a "downstream" metering device (e.g., a very small clearance) to control fluid leaving the slits 221-226. Upstream of the dampers, pressurized fluid is supplied. When the metering is used, it pressurized ALL the fluid in all the slits 221-226 and suppressing cavitation and defining the character of the damping provided in the slits 221-226. The damping and centering system 155 includes the bearing assembly 202 disposed between the support 115 and the shaft 154 as relatively rotating bodies. The inner race 204 is disposed on the shaft 154 and the outer race is seated on the support 115. The elements 208 are disposed between the inner race 204 and the outer race 206. The outer race 206 includes the slit 221 (as an example), which extends through the outer race 206 and opens through the face 230 and through the face 232.

A fluid supply block 280 (FIG. 4) is disposed on the side of the outer race 206 against the face 232 and may be seated on the support 115. It will be understood that the fluid supply block 280 may extend circumferentially around the outer race 206 to supply fluid to all the slits 221-226 and may include a number of fluid passages 282. The fluid supply passages 282 may include a manifold 284 to distribute the fluid around the circumference of the outer race 206. The fluid supply block 280 includes a cavity 286 that registers with the slit 221 and/or its aperture(s) 250, 252 and serves as an oil delivery annulus. The cavity 286 may be a full annulus and supply oil to all the slits 221-226 and all their apertures simultaneously. Fluid supply to the cavity 286 may be a discrete manifold 284 (only 1 location-drilled) and at minimum is embodied as a single drilled port 294 from the manifold to the cavity 286. The force 288 of a spring 290, or springs, may bias the fluid supply block toward the face 232. A pump 292 supplies pressurized fluid (oil) to the manifold 284 as part of a fluid delivery system. A fluid passage 294 is defined in the fluid supply block 280 providing a fluid connection between the manifold 284 and the cavity 286. From the cavity 286, the fluid enters the slit 221 and/or the apertures (e.g., 250, 252). The fluid pressure in the cavity 286 is set by the pump 292. A spring 290 ensures the faces are in contact and oil does not leak before entering the slits 221-226. Generally, the force 288 of the spring(s) 290 is set to maintain the fluid supply block 280 in position against the face 232. The fluid supply block 280 may include other passages 282 such as fluid passage 298 for other purposes, such as to direct fluid to other parts of the bearing assembly 202. Pressurizing the fluid may provide benefits such as preventing cavitation.

A metering plate in the form of a seal plate 300 is positioned on the face 230 side of the outer race 206. The seal plate 300 may be fixed to the outer race 206 and/or to the support 115. A gap or set of gaps referred to as orifice 302 is defined between the seal plate 300 and the face 230 of the outer race 206. Fluid supplied to the slits (e.g., 221) is metered out of the slits by the orifice 302. The size 304 (such as the clearance between the seal plate 300 and the outer race 206) of the orifice 302 is tailored the pressure in the slit 221 to provide the level of damping desired for the application, by restricting flow out. Supplying the pressurized fluid at the flow inlet at the cavity 286 along with a metered outlet flow orifice 302 may be used to pressurize the fluid in the slits 221-226 and achieve a targeted behavior of the force vs motion character from the squeezing action of the fluid. In embodiments, the orifice 302 may be a number of holes distributed around the circumference as local features or may be an annular gap, or another configuration. In embodiments, supplying the fluid at the flow inlet with no metered flow orifice on outlet such that the fluid in the slits 221-226 remains at ambient pressure may be used to achieve an optional targeted behavior of the force vs. motion character from the squeeze action of the fluid.

Figure 5:
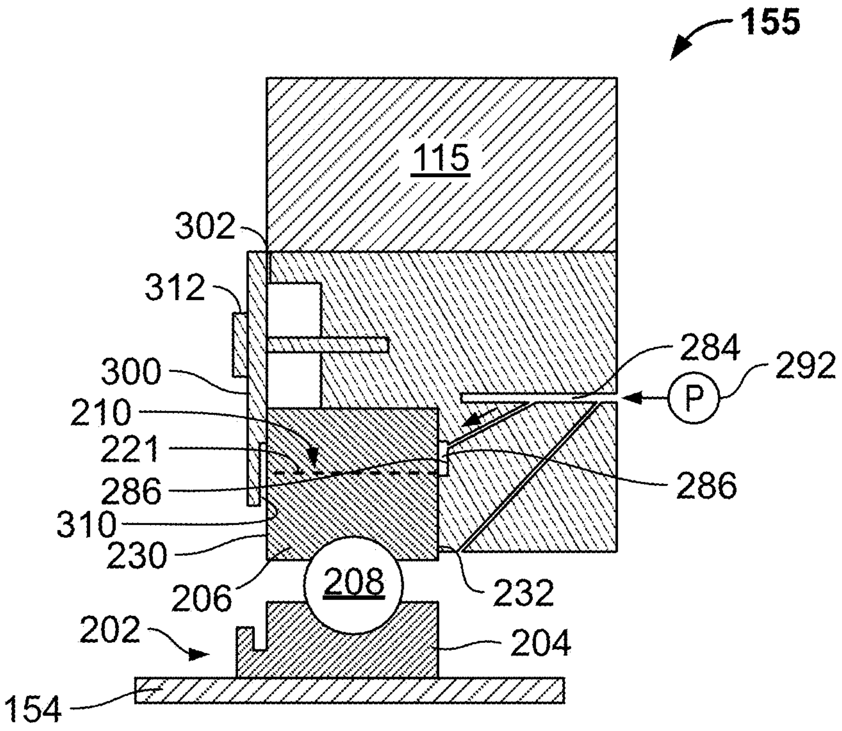
FIG. 5 is a sectional illustration taken generally through the area of the line 4-4 of FIG. 2, according to an alternate exemplary embodiment.
Figure 6:
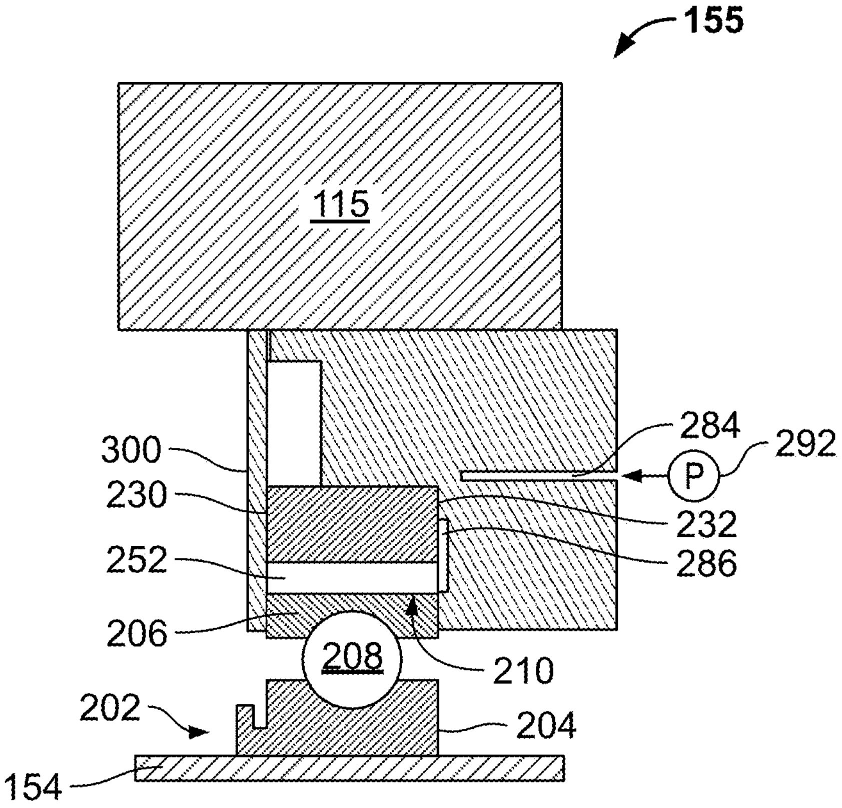
FIG. 6 is a sectional illustration taken generally through the area of the line 6-6 of FIG. 2, according to an exemplary embodiment.

Referring to FIGS. 5 and 6, metering of the fluid exiting the slit 221, which is representative of the slits 221-226 of the damper set 210, may be accomplished by orifices 310 extending radially inward providing controlled fluid expulsion from the slit 221. As shown in FIG. 6, the cavity 286, as a complete annulus, registers with the aperture 252 for fluid supply. Also shown in FIG. 6, the seal plate 300 covers the other end of the apertures (in this view aperture 252) to prevent unimpeded leakage therefrom. The orifice(s) 302 may be included or omitted with some limited flow out of the dampers provided so the oil does not overheat. An element or elements 312, such as threaded bolts ensure the seal plate 300 is seated firmly. Tuning may be provided through the orifices 310 (or 302 also if 310 exited radially outboard).

Accordingly, a damping and centering system is provided for use at a bearing location in a rotating machine where damping is desired. Springs are disposed adjacent slits where the springs are configured to provide movement in a ring of the bearing. The slits are configured to provide damping in the ring at locations disposed in a radially stacked arrangement relative to the springs for an axially compact assembly. Fluid is flowed axially through small clearance spaces (slits) on both sides of the springs. As the inner portion of the outer race moves radially relative to the outer portion of the outer race, the fluid is squeezed. The squeezing of the fluid creates a desirable damping force. Pressurization and pressure control allow for additional desirable characteristics of the damper. The design of the springs allows for anisotropic stiffness in the structure (e.g., stiffness in the vertical direction to be different from the stiffness in the horizontal direction), which may be desirable in various rotor dynamic systems. The anisotropy may be achieved by varying the thickness of the springs and/or by varying their circumferential extent. The slits may be machined using electrical discharge machining, water jet cutting, or other methods.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system providing damping and centering for rotating machinery, the system comprising:
- a support;
- a shaft disposed to rotate about an axis and relative to the support; and
- a ring encircling the axis;
- wherein the ring is configured to receive a bearing element;
- wherein the ring has a first axially directed face and a second axially directed face;
- wherein the ring includes fluid apertures that are axially disposed and radially located outward from the axis, the fluid apertures opening through the first axially directed face and through the second axially directed face;
- wherein the ring includes arcing slits, each arcing slit beginning at one of the fluid apertures and ending at another of the fluid apertures;
- a fluid delivery system configured to deliver a fluid to at least one of the fluid apertures and the arcing slits, at the first axially directed face;
- a fluid supply block disposed adjacent the first axially directed face, the fluid supply block defining fluid passages as part of the fluid delivery system, the fluid passages coupled with the arcing slits and including a port that is open to the arcing slits at the axially directed face; and
- a bias spring biasing the fluid supply block toward the ring,
- wherein the fluid delivery system is configured to deliver fluid into the arcing slits so that the fluid in the arcing slits provides a damping action in the ring.

2. The system of claim 1, wherein a spring ring with springs is defined between the arcing slits.

3. The system of claim 1, wherein the fluid supply block includes a first side facing the first axially directed face with a cavity formed in the first side and registering with the arcing slits, wherein the fluid supply block includes a second side opposite the first side, wherein the fluid passages of the fluid supply block include a manifold entering the fluid supply block through the second side, wherein the port runs from the manifold to the cavity, and comprising a pump coupled with the manifold.

4. The system of claim 3, wherein the fluid passages include a lubrication passage that extends from the manifold to the bearing element.

5. The system of claim 1, comprising a metering plate disposed at the second axially directed face and configured to meter fluid out of the slits and to block fluid flow out of the apertures.

6. The system of claim 1, wherein springs are defined by the arcing slits and comprise beams, wherein a first one of the beams has a first stiffness in a first orthogonal direction defined by a first radial thickness and a first circumferential extent, wherein a second one of the beams has a second radial stiffness in a second orthogonal direction defined by a second radial thickness and a second circumferential extent, wherein the first stiffness is different than the second stiffness.

7. The system of claim 1, wherein springs are defined by the slits and the springs are configured with stiffness values in the two radial directions tuned to provide desired properties, the stiffness values being different from each other in two orthogonal directions.

8. The system of claim 1, wherein the slits are arranged in two concentric circles with an inner circle defined by three of the slits and an outer circle defined by a different three of the slits.

9. The system of claim 1, wherein springs are disposed adjacent the slits, and wherein the springs are configured to provide movement in the ring and the slits are configured to provide damping in the ring at a location disposed in a radially stacked arrangement relative to the springs for an axially compact assembly.

10. A system providing damping and centering for rotating machinery, the system comprising:
- a support;
- a shaft disposed to rotate about an axis and relative to the support; and
- a ring encircling the shaft and the axis;
- wherein the ring is configured to receive a bearing element;
- wherein the ring has a first axially directed face and a second axially directed face;
- wherein the ring includes fluid apertures that are axially disposed and radially located outward from the axis, the fluid apertures opening through the first axially directed face and through the second axially directed face;
- wherein the ring includes arcing slits, each arcing slit beginning at one of the fluid apertures and ending at another of the fluid apertures;
- a fluid delivery system configured to deliver a fluid to at least one of the fluid apertures and the arcing slits, at the first axially directed face; and
- a fluid supply block disposed adjacent the first axially directed face, the fluid supply block defining fluid passages as part of the fluid delivery system, the fluid passages coupled with the arcing slits and including a port that is open to the arcing slits at the axially directed face,
- wherein the fluid passages of the fluid supply block include a manifold entering the fluid supply block, wherein the port runs from the manifold,
- wherein the fluid passages include a lubrication passage that extends from the manifold to the bearing element,
- wherein the fluid delivery system is configured to deliver fluid into the arcing slits so that the fluid in the arcing slits provides a damping action in the ring.

11. The system of claim 10, wherein a spring ring with springs is defined between sets of the arcing slits, the springs comprising beam type springs.

12. The system of claim 10, wherein the fluid supply block includes a first side facing the first axially directed face with a cavity formed in the first side and registering with the arcing slits, wherein the fluid supply block includes a second side opposite the first side, wherein the manifold enters the fluid supply block through the second side, wherein the port runs from the manifold to the cavity, and comprising a pump coupled with the manifold.

13. The system is claim 10, comprising a metering plate disposed at the second axially directed face and configured to meter fluid out of the slits and to cover the apertures at the second axially directed face and to block fluid flow out of the apertures.

14. The system of claim 10, wherein springs are defined by the arcing slits and comprise beams, wherein a first one of the beams has a first stiffness in a first orthogonal direction defined by a first radial thickness and a first circumferential extent, wherein a second one of the beams has a second radial stiffness in a second orthogonal direction defined by a second radial thickness and a second circumferential extent, wherein the first stiffness is different than the second stiffness.

15. The system of claim 10, comprising a spring biasing the fluid supply block toward the ring.

16. The system of claim 10, wherein each if the slits extends between a pair of lands that extend radially between adjacent slits, wherein the slits are arranged in two concentric circles with an inner circle defined by a set of the slits and an outer circle defined by a different set of the slits.

17. The system of claim 10, wherein springs are disposed adjacent to and between sets of the slits, and wherein the springs are configured to provide movement in the ring and the slits are configured to provide damping in the ring at a location disposed in a radially stacked arrangement relative to the springs for an axially compact assembly.

18. A system providing damping and centering for rotating machinery, the system comprising:

a support;

a shaft disposed to rotate about an axis and relative to the support;

a ring defining an open center and encircling the axis;

wherein the ring is configured to receive a bearing element in the open center;

wherein the ring has a first axially directed face and a second axially directed face;

wherein the ring includes fluid apertures that are axially disposed and radially located outward from the open center, the fluid apertures opening through the first axially directed face and through the second axially directed face;

wherein the ring includes arcing slits, each arcing slit beginning at one of the fluid apertures and ending at another of the fluid apertures;

a fluid delivery system configured to deliver a fluid through a port to the fluid apertures and/or to the arcing slits, at the first axially directed face;

a fluid supply block disposed adjacent the first axially directed face, the fluid supply block defining fluid passages coupled with the arcing slits, wherein the fluid passages of the fluid supply block include a manifold entering the fluid supply block, wherein the port runs from the manifold, wherein the fluid passages include a lubrication passage that extends from the manifold to the bearing element;

a spring biasing the fluid supply block toward the ring; and a metering plate configured to meter the fluid exiting the fluid apertures at the second axially directed face, wherein the fluid delivery system is configured to deliver fluid to the arcing slits through the fluid apertures so that the fluid in the arcing slits provides a damping action in the ring.

* * * * *